(12) United States Patent
Boehringer

(10) Patent No.: US 6,640,490 B1
(45) Date of Patent: *Nov. 4, 2003

(54) PLANT PROTECTION MAT, ESPECIALLY IN THE FORM OF A PERFORATED DISK

(76) Inventor: Eberhard Boehringer, Apelstedt Nr. 16, 27211 Bassum (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/509,225

(22) PCT Filed: Sep. 24, 1998

(86) PCT No.: PCT/EP98/06088

§ 371 (c)(1), (2), (4) Date: Apr. 20, 2000

(87) PCT Pub. No.: WO99/16297

PCT Pub. Date: Apr. 8, 1999

(30) Foreign Application Priority Data

Sep. 26, 1997 (DE) .................................. 297 17 422 U

(51) Int. Cl.[7] .................................................. A01G 7/00
(52) U.S. Cl. .................................. 47/9; 47/32; 47/32.7
(58) Field of Search .................... 47/25, 9, 32; 111/102; 241/168

(56) References Cited

U.S. PATENT DOCUMENTS 4,794,726 A * 1/1989 Fawcett et al. .................... 47/9
5,226,255 A * 7/1993 Robertson ........................ 47/56
5,396,731 A * 3/1995 Byrne ............................. 47/25
5,555,674 A * 9/1996 Molnar et al. ................... 47/56

FOREIGN PATENT DOCUMENTS

DE         4333758 A1 *  4/1995
DE         29709199 U1 * 9/1997
FR         2590763 A1 *  6/1987
FR         2705862 A1 * 12/1994
JP         407147844 A * 5/1995

OTHER PUBLICATIONS

Coir Plus Exports, horticulture products, Weed Control Mats, www.Isplk.com/coirplus/, 5 pages.*

* cited by examiner

*Primary Examiner*—Peter M. Poon
*Assistant Examiner*—Andrea M. Valenti
(74) *Attorney, Agent, or Firm*—Jordan and Hamburg LLP

(57) ABSTRACT

A plant-protection mat, particularly in the form of a perforated disk which, in the use position above the root bale of a plant, is intended as soil covering. The perforated disk is formed from a coconut fiber nonwoven having coconut fibers bonded by latex. The coconut fibers of the perforated disk, on the one hand, are fixed by way of contour-forming stiffening edges and, on the other, the perforated disk in the region of the upper and lower covering zones, has pore structures with different opening widths.

7 Claims, 3 Drawing Sheets

PLANT PROTECTION MAT, ESPECIALLY IN THE FORM OF A PERFORATED DISK

BACKGROUND OF THE INVENTION

Figure 1:
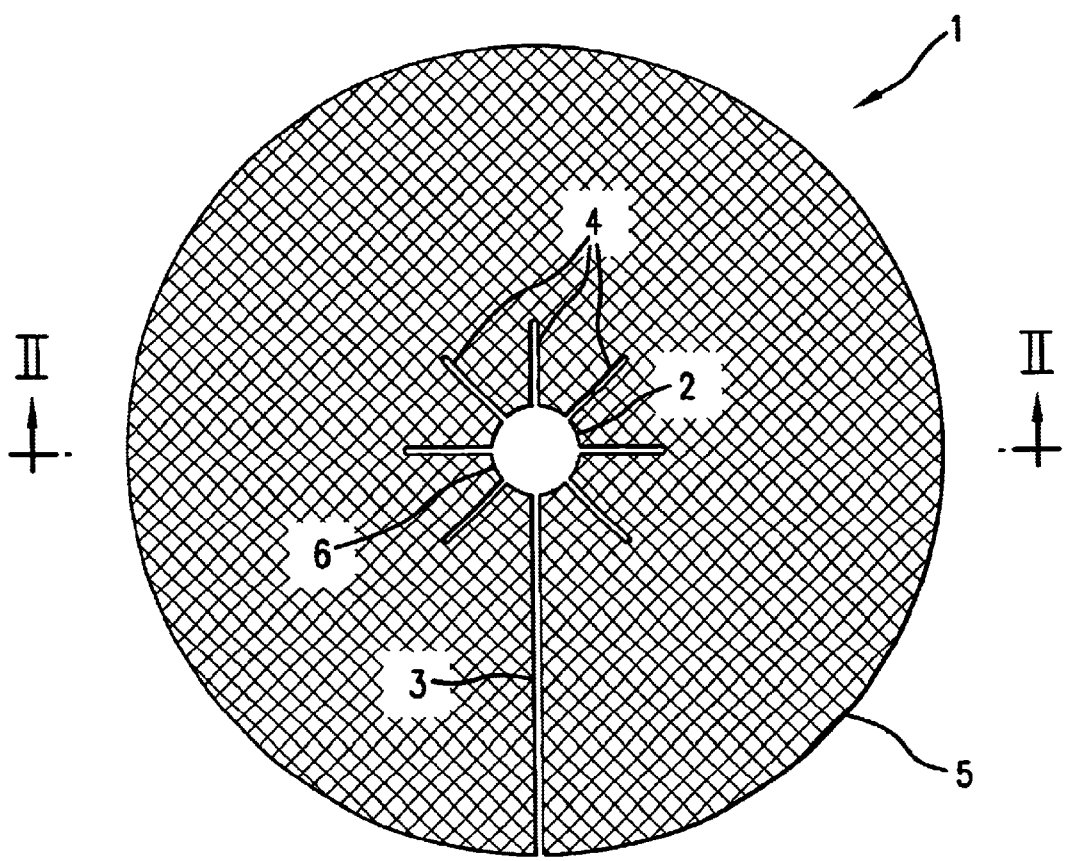

The invention relates to a plant-protection mat, particularly in the form of a perforated disk, Known plant-protection mats (DE 2537056) in the form of perforated disks, are provided as soil coverage above the root bale of plantations. The covering mats are constructed as two-layer parts with a felt layer, having jute and coconut fibers, and an additional fabric layer. These two-layer parts have to be combined by quilting or needle-punching, so that the manufacturing expense is disadvantageously increased. In addition, the different materials of the covering mats cause a disadvantageously high expense during the disposal.

SUMMARY OF THE INVENTION

The invention is concerned with the problem of creating a plant-protection mat, particularly in the form of a perforated disk, which can be produced with little expenditure for material and costs in largely any size and has a structure, stable for a sufficiently long period of time, so that it can be used repeatedly as a water-storing as well as an opaque protective element and disposed of easily.

The inventive plant-protection mat is constructed as a molded object, which consists only of coconut fibers and latex and the coconut fibers of which, fixed at a contour-forming reinforcing edge, in conjunction with the latex particles of the nonwoven coconut fiber material, form light-tight and at least regionally liquid-storing covering zones with pore structures improving the usefulness of the mat. Moreover, the molded object can be handled well, remains dimensionally stable even under rough use conditions and, while having adequate decaying resistance, enables repeated as well as long-term stable use of the perforated disks with largely any dimensions and circumferential contours. The disposal of such plant-protection mats is extremely easy, since their latex components and coconut fiber components can decay completely and, with that, the mats can be comminuted at little cost and composted.

The nonwoven coconut fiber material, intended for the production of the plant-protection mat, advantageously may consist of unsorted, processed coconut fibers, which are loosened over a porcupine roller or the like from a crude bale, removed and supplied to a conveyor belt under the action of gravity, so that in each case shorter coconut fiber portions form a lower zone and longer coconut fibers an upper zone of the nonwoven sheet intended as an intermediate product. The nonwoven sheet is sprayed with a binder (latex), so that a disordered combination of nonwoven parts is formed in the cross section of the sheet. In an appropriate embodiment, the parts by weight of coconut fiber and latex mixture supplied are equal, that is, in each case 50% by weight of coconut fiber and 50% by weight of latex mixture are supplied for forming the nonwoven.

Subsequently, in a continuous passage with a short residence time, this nonwoven sheet is supplied to a severing process, carried out by means of a punching tool, several perforated disks being severed simultaneously from the nonwoven sheet in a single punching action. During this severing process, the contour-forming reinforcing edge is formed, in the region of which the coconut fibers and the latex components, which have not cured up to this time, are consolidated under the action of the cutting force in such a manner, that subsequently the stiffened edges impart an advantageous contour stability to the perforated disks. At the same time, the pore structures, forming different opening widths, are formed in the top and bottom of the covering zone by a consolidation of the coconut fiber-latex combination. The perforated disks, punched out of the nonwoven sheet, can be compressed to about 30% of the initial height of the nonwoven coconut fiber sheet.

In an appropriate construction, the perforated disk can also be produced from two layers of nonwoven coconut fibers, connected in the region of the stiffening edges. In this case, the layer of nonwoven coconut fibers, which is the lower one in the use position, is already prepared as a consolidated nonwoven sheet by a pressing process taking place before the punching process. This layer then forms the lower covering zone with comparatively small opening width. The second sheet-shaped nonwoven coconut fiber layer, consisting of loosely connected coconut fibers and latex, is placed over this nonwoven coconut layer. After that, the joint severing and punching process takes place, so that a perforated disk with a stable contour and two covering zones is achieved.

For the above-described production of the perforated disks, the severing process also forms the radial slit starting out from the central hole. The contour of the disk, the central hole and the radial slit are produced in one operation by the punching equipment, so that the manufacturing expense is very low.

Further details and advantages of the invention arise out of the following description and the drawing, which illustrates several embodiments of the inventive plant-protection mat in the form of a perforated disk in greater detail.

IN THE DRAWINGS

Figure 2:
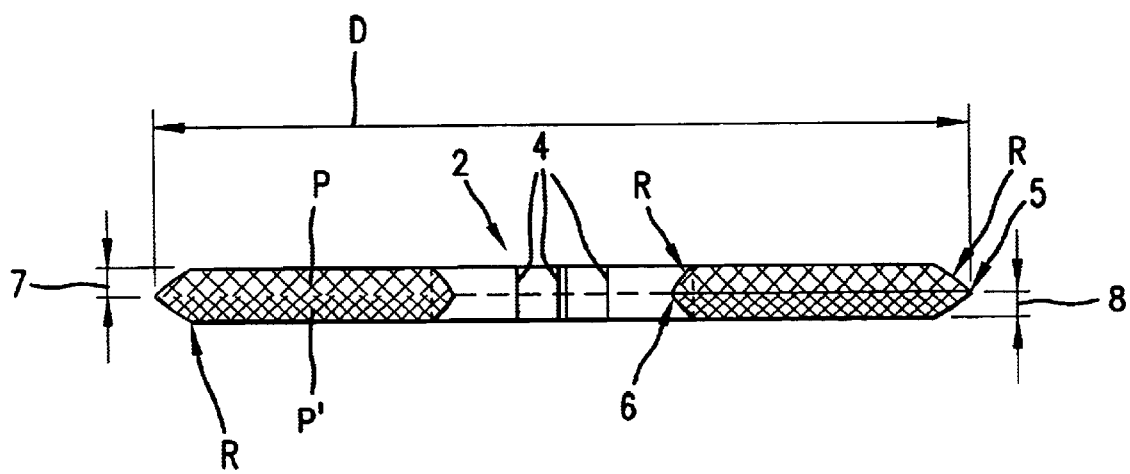
Figure 3:
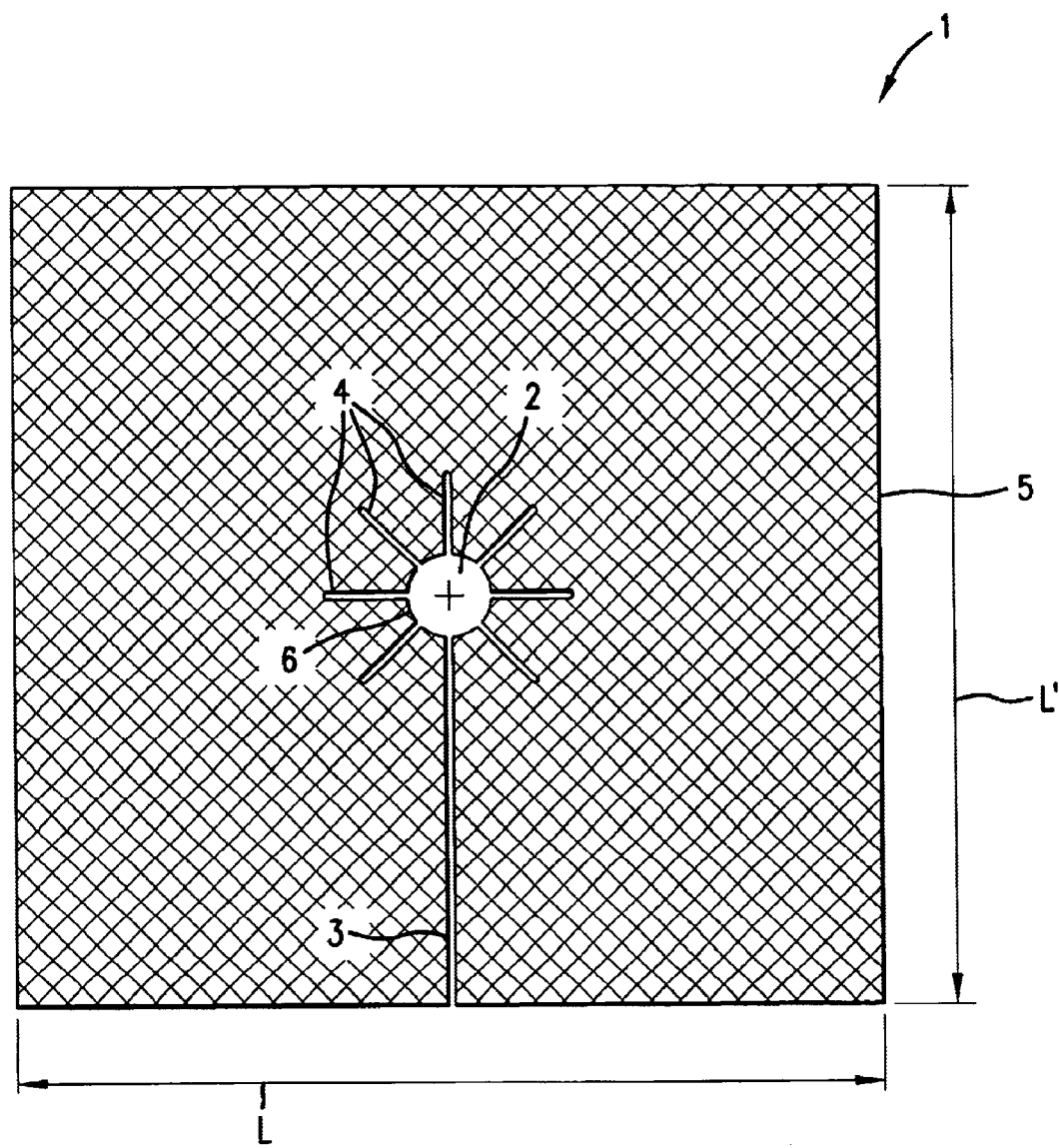
Figure 4:
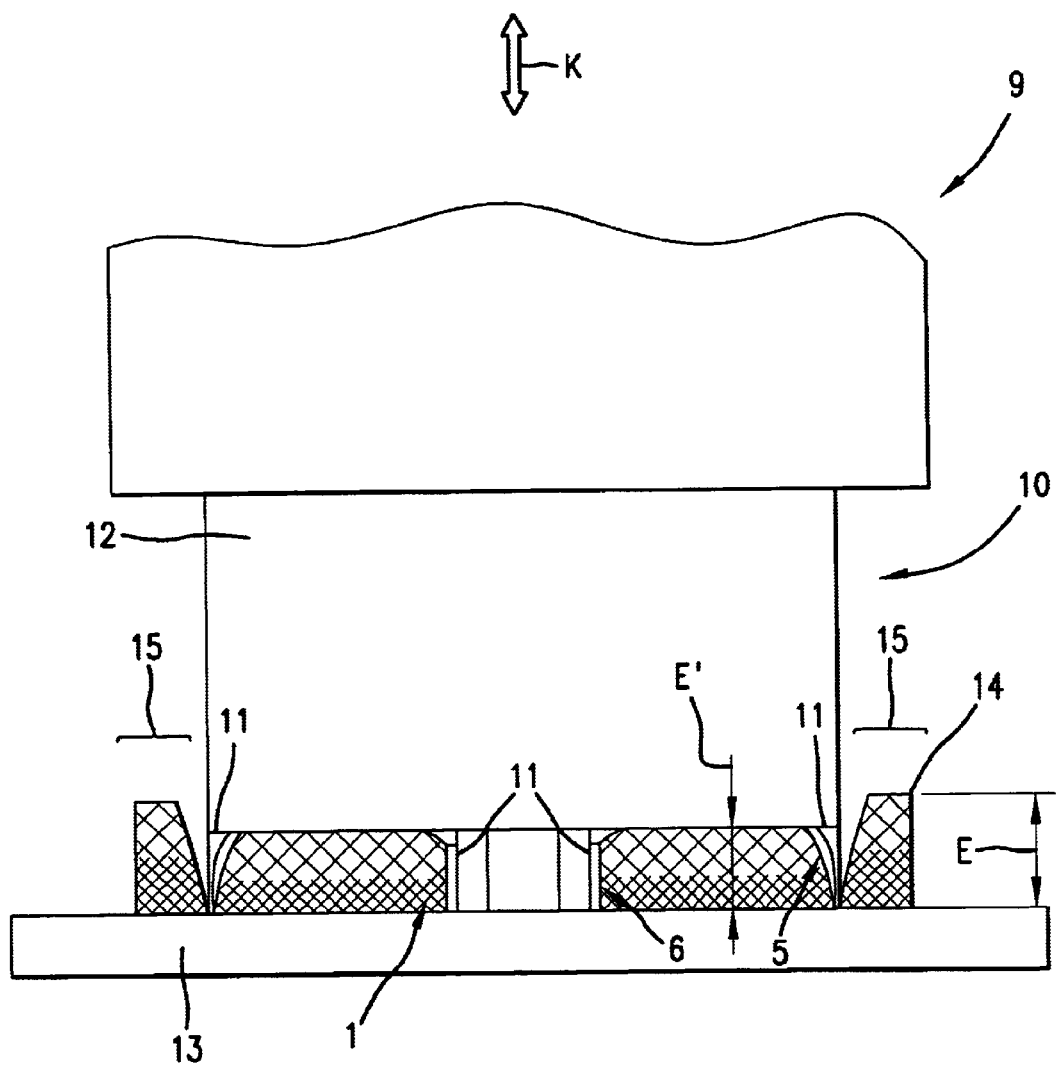

FIG. 1 shows a plan view of an inventive plant protection mat with a circular outer contour, FIG. 2 shows a sectional representation along the line II—II of FIG. 1, FIG. 3 A shows a plan view of the plant protection mat, similar to that of FIG. 1, with a rectangular outer contour of the perforated disk, and FIG. 4 shows a diagrammatic representation of the punching process for the production of the perforated disk.

DESCRIPTION OF THE PREFERRED EMBODIMENTS

In FIG. 1, a plant-protection mat, shaped in the form of a perforated disk 1, is shown in plan view. Within the circular peripheral contour of the mat, which has a diameter D, a central hole 2 as well as radial slots 3 and 4, emanating from the central hole 2, are clearly evident. The continuous slit 3 enables the perforated disk 1 to be positioned in the use position above the root bale of a plant, which is encompassed in the region of the central hole 2, so that the surrounding root bale is covered. By way of the short slits 4, adaptation to the different plant diameters is attained.

The perforated disk 1, constructed pursuant to the invention, is formed from a nonwoven coconut material, comprising only coconut fibers and latex. The coconut fibers of the perforated disk 1, on the one hand, are fixed in the region of all contour-forming reinforcing edges 5, 6 and, on the other, form pore structures P, P' having openings of different width in the region of the top and bottom covering zones 7, 8.

In a technological appropriate embodiment, the perforated disk 1 has essentially short coconut fibers in the region of the underside of the covering zone 8 and essentially long coconut fibers in the region of the upper side of the covering zone P. These fibers are hooked together over the two zones and, with the connecting latex components, form tight structures, which have light-tight and liquid-retention properties.

The starting material for the production of the perforated disk I is a nonwoven coconut fiber sheet 14 (FIG. 4) with advantageously priced, unsorted, processed coconut fibers, which are extracted from a crude bale, for example, by means of a porcupine roller or the like and reach the transporting unit disordered, in free fall, so that, in an optimum manner for the intended end product (perforated disk), in each case short coconut fiber parts are concentrated at the bottom on the transporting unit and long coconut fiber portions remain in the region of the upper layer of the nonwoven sheet 14. During the production of this nonwoven sheet, a latex mixture is supplied continuously as binder in such a manner that 50% by weight of fibers and 50% by weight of binder are distributed in the nonwoven sheet. If necessary, any variation of these proportions is possible so that perforated disks 1, specifically adapted to the customer's requirements, are prepared with different weights per unit area.

This coconut fiber nonwoven, in the form of the nonwoven sheet 14, is supplied to an area punch 9 (FIG. 4), which is provided in an appropriate embodiment with a repeatedly usable punching tool 10, which specifies a respective shape of the contour of the perforated disk 1 over punching knife lines 10. These punching knife lines 10 are supported in contour grooves in the region of the upper supporting plate 12 in accordance with the circumferential contour D provided (FIG. 1) or L, L' (FIG. 3). In the region of the contour grooves, rapid adaptation to customer-specific and application-specific contour changes is possible with little expenditure for retooling.

In one operation (arrow K, FIG. 4), the supporting plate 12 with the punching knife lines 11 is moved downward to a base plate 13 and the coconut fiber nonwoven, which has an initial height E, is severed in the region of the peripheral contour 5 or the edge of the hole 6 while simultaneously being pressed over the whole surface to the height E', so that subsequently the reinforcing edges (FIG. 1) are formed in these regions. After this punching stroke K is carried out, the perforated disk 1 and the rest of the material 15, left over after the punching operation, is transported out of the area punch 9. The rest of the material 15 can be worked up and used again as starting material, so that complete processing of the crude bale is achieved.

The manufacturing process, described above, makes it clear that the perforated disk 1 is formed simultaneously during the severing process in the region of its peripheral contour 5, of the edge 6 of the hole, of its central hole 2 and of the radial slits 3, 4 and, with that, the pressing, as well as a cutting process, bringing about the curing of the latex— coconut fiber mixture, take place simultaneously in these regions. Subsequently, the mat components are fixed at the edge in the form of a gluing, so that they can withstand stresses. When used as intended, this perforated disk 1, which has a stiff contour, can take up water in the pore structures. At the same time, however, an unintended extensive swelling or tearing open of the mat is avoided for a long period by the bonding strength in the stiffening edges 5, 6. Even after the bonded structure is loosened at a later time in the region of the edges 5, 6, the protective effect of the perforated disk 1 as a whole is retained.

In a further embodiment, it is conceivable that the perforated disk 1 consists of several nonwoven coconut fiber layers, which correspond in their intended application largely to the covering zone 7, 8 and in turn are also formed from prefabricated nonwoven sheets 14. The nonwoven coconut fiber layer 8, which is the lower layer in the use position, consists of a pre-consolidated nonwoven sheet, onto which the unconsolidated nonwoven sheet is placed. After that, the perforated disk 1 can be shaped by a joint severing process corresponding to the punching described above and the two starting layers subsequently are an integral component of the two-layer perforated disk.

When the inventive perforated disks 1 are used as soil cover, the covering zones 7, 8 provide an adequately light-impenetrable structure, which can prevent the growth of weeds. At the same time, in the region of the lower covering zone 8, the tighter pore structure P' provides protection against evaporation and also functions as a liquid and/or nutrient reservoir. The weight per unit area of the perforated disk 1 advantageously is such that, especially when used on light soils, culture substrates or the like, wind erosion is avoided in the region of the root bale.

For improving the long-term stability of the perforated disk 1, the latter advisably can be subjected to vulcanizing after the above-described punching process has been carried out, so that subsequently, due to the connections between the latex parts and the coconut fibers, the perforated disk 1 has advantageous elastic properties and an improved long-term stability and the tear strength, particularly that in the region of the slits 4, is increased and the handling of the perforated disk 1, even for repeated use with different plant cultivations, is facilitated. The perforated disks 1 can be disposed of without problems, since they can be comminuted at little cost and supplied to a biological decaying process.

In the region of its contour dimensions D; L, L', the perforated disk can be adapted with little effort to the diameters of plant pots or the like so that the latter are covered completely in the region of the root bale. Likewise, for decorative purposes, it is conceivable to configure the surface of the perforated disk 1, visible in the region of the covering zone 8, optically attractively with, for example, coloration, advertising inscription, name embossing or the like or to provide information concerning use of the perforated disk 1 directly to the user.

What is claimed is:

1. A method of producing a plant-protection mat, comprising:

obtaining coconut fibers;

arranging said coconut fibers in a layer in such manner that relatively short coconut fibers are concentrated at a bottom of said layer and relatively long coconut fibers remain in a greater proportion in an upper position of said layer;

applying a latex mixture to said layer of coconut fibers as a binder to form a non-woven coconut fiber sheet; and forming a mat body of specified shape from said non-woven coconut fiber sheet prior to curing of the latex, said step of forming including cutting a mat body having a desired peripheral contour and pressing at least an area portion of said mat body.

2. A method according to claim 1, wherein said step of cutting includes punching said mat body out of an expanse of said non-woven coconut fiber sheet.

3. A method according to claim 2, wherein said step of pressing is carried out simultaneously with said step of punching.

4. A method according to claim 2, further comprising:

forming at least one central hole and at least one radial slit simultaneously during said step of punching said mat body.

5. A method according to claim 1, further comprising:

preconsolidating said non-woven coconut sheet to form a lower non-woven coconut fiber layer with a preconsolidated fiber structure;

placing an unconsolidated upper non-woven coconut fiber layer on said lower non-woven coconut fiber layer prior to said step of forming; and pressing said layers together to form a mat body comprised of more than one layer.

6. A method according to claim 1, wherein said coconut fibers are loosened, unsorted processed coconut fibers.

7. A method according to claim 1, wherein said latex mixture is supplied to said layer of coconut fibers in an amount approximately equal by weight to said coconut fibers.

* * * * *